(12) United States Patent
Kim et al.

(10) Patent No.: US 7,736,797 B2
(45) Date of Patent: Jun. 15, 2010

(54) RECHARGEABLE BATTERY AND METHOD OF MANUFACTURING THE SAME

(75) Inventors: Yong-Sam Kim, Yongin-si (KR); Ki-Ho Kim, Yongin-si (KR); Jae-Kyung Kim, Yongin-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 947 days.

(21) Appl. No.: 11/480,616

(22) Filed: Jul. 3, 2006

(65) Prior Publication Data
US 2007/0009793 A1    Jan. 11, 2007

(30) Foreign Application Priority Data
Jul. 5, 2005    (KR) .................. 10-2005-0060120

(51) Int. Cl.
*H01M 2/28* (2006.01)
*H01M 2/04* (2006.01)
*H01M 2/02* (2006.01)

(52) U.S. Cl. .................. 429/161; 429/176; 429/178

(58) Field of Classification Search .................. 429/170, 429/163, 167, 175, 176, 177, 178, 179, 161
See application file for complete search history.

(56) References Cited

U.S. PATENT DOCUMENTS

| | | | |
|---|---|---|---|
| 5,213,314 A | | 5/1993 | Kano et al. |
| 5,633,095 A | * | 5/1997 | Ishikawa et al. ............ 429/1 |

| | | | |
|---|---|---|---|
| 2003/0129479 A1 | * | 7/2003 | Munenaga et al. ............ 429/94 |

FOREIGN PATENT DOCUMENTS

| | | |
|---|---|---|
| GB | 1278585 | 6/1972 |
| GB | 2 004 410 A | 3/1979 |
| JP | 62-177866 | 8/1987 |
| JP | 2000-40501 | 2/2000 |
| JP | 2000-150306 | 5/2000 |
| JP | 2002-279961 | 9/2002 |

(Continued)

OTHER PUBLICATIONS

Patent Abstract of Japan, Publication number 2000-040501, published on Feb. 8, 2000, in the name of Itagaki, et al.

(Continued)

*Primary Examiner*—Dah-Wei D. Yuan
*Assistant Examiner*—Stephan Essex
(74) *Attorney, Agent, or Firm*—Christie, Parker & Hale, LLP (57) ABSTRACT

A rechargeable battery includes an electrode assembly comprising a positive electrode, a negative electrode, and a separator interposed therebetween, the electrode assembly having an uncoated region; a case for housing the electrode assembly; an outer terminal; a cap assembly combined with the case and sealing the case, and combined with the outer terminal; and a tab. The tab includes a terminal element connected with the outer terminal; left and right connection elements extended from ends of the terminal element and disposed to correspond to each other in parallel; and left and right inward junction elements connected at respective sides of the left and right connection elements through respective bending areas to form gaps relative to a part of the respective left and right connection elements and electrically connected with the uncoated region of the electrode assembly through the gaps.

16 Claims, 8 Drawing Sheets

FOREIGN PATENT DOCUMENTS

| | | |
|---|---|---|
| JP | 2002-279962 | 9/2002 |
| JP | 2003-173765 | 6/2003 |
| JP | 2003-249423 | 9/2003 |
| JP | 2003-346774 | 12/2003 |
| JP | 2003-346882 | 12/2003 |
| JP | 2004-111300 | 4/2004 |
| JP | 2005-032477 | 2/2005 |

OTHER PUBLICATIONS

Patent Abstracts of Japan, Publication No. 2000-150306; Date of Publication: May 30, 2000; in the name of Kazuyuki Toki.

Patent Abstracts of Japan, Publication No. 2003-346774; Date of Publication: Dec. 5, 2003; in the name of Hiroshi Tasai et al.

Patent Abstracts of Japan, Publication No. 2003-346882; Date of Publication: Dec. 5, 2003; in the name of Hiroshi Tasai et al.

Patent Abstracts of Japan, Publication No. 2004-111300; Date of Publication: Apr. 8, 2004; in the name of Jo Sasaki.

Japanese Office action dated Feb. 2, 2010, for corresponding Japanese application 2006-184870, noting listed references in this IDS, as well as JP 2000-150306 previously filed in an IDS dated Jan. 9, 2008.

* cited by examiner

RECHARGEABLE BATTERY AND METHOD OF MANUFACTURING THE SAME

CROSS-REFERENCE TO RELATED APPLICATION

This application claims priority to and the benefit of Korean Patent Application No. 10-2005-0060120 filed in the Korean Intellectual Property Office on Jul. 5, 2005, the entire content of which is incorporated herein by reference.

FIELD OF THE INVENTION

The present invention relates to a rechargeable battery. More particularly, the present invention relates to a rechargeable battery that can be easily fabricated and has improved current collecting efficiency.

BACKGROUND OF THE INVENTION

Rechargeable batteries generally include an electrode assembly which is formed by spirally winding sheet-shaped positive and negative electrodes and a separator serving as an insulator, or by stacking positive and negative electrodes and an insulating separator in a multi-layer structure. Leads or tabs are attached to the electrodes and to outer terminals.

Since large-capacity batteries for so-called Hybrid Electric Vehicles (HEVs) have bigger positive and negative electrodes in proportion to the size thereof, and thereby have increased resistances, they need a separate tab to maximize a current collecting area. Such a tab can connect an uncoated region of an electrode assembly with a terminal in a prismatic secondary battery.

SUMMARY

A rechargeable battery includes an electrode assembly with a positive electrode, a negative electrode, and a separator interposed therebetween. The electrode assembly has an uncoated region. The rechargeable battery also includes a case for housing the electrode assembly; an outer terminal; a cap assembly combined with the case and sealing the case, and combined with the outer terminal; and a tab. The tab includes a terminal element connected with the outer terminal; left and right connection elements extended from ends of the terminal element and disposed to correspond to each other in parallel; and left and right inward junction elements connected at respective sides of the left and right connection elements through respective bending areas to form gaps relative to a part of the respective left and right connection elements and electrically connected with the uncoated region of the electrode assembly through the gaps.

In one embodiment, the gaps are predetermined. The terminal element, the left and right connection elements, and the left and right inward junction elements may be formed of an integrally combined plate or may be integrally combined by plate-processing a metal plate.

In one embodiment, the terminal element of the tab is bent at right angles relative to each of the left and right connection elements, and the left and right connection elements are bent at an angle of 180° relative to the left and right inward junction elements through the respective bending areas.

The left and right connection elements of the tab may have respective ends, and an area from each of the respective ends to a connection part of the terminal element may be the same. The gaps may hold the uncoated region of the electrode assembly, and may have a same thickness as that of the uncoated region.

The terminal element may be welded to the outer terminal.

In one embodiment, the left and right connection elements of the tab are disposed on a first side of the uncoated region, and the left and right inward junction elements are disposed on a second side of the uncoated region. The electrode assembly may have an inside and an outside, and the first side of the uncoated region may face the outside and the second side of the uncoated region may face the inside.

In another embodiment, the left and right inward junction elements are connected with the uncoated region through ultrasonic welding. The left and right connection elements of the tab may be extended up to each end of the left and right inward junction elements and may be connected with the left and right inward junction elements through each bending area. The gaps may further be formed over entire lengths of the left and right inward junction elements and the left and right connection elements respectively corresponding thereto.

One embodiment of a motor system includes a rechargeable battery and a motor. The rechargeable battery includes an electrode assembly including a positive electrode, a negative electrode, and a separator interposed therebetween, the electrode assembly having an uncoated region; a case for housing the electrode assembly; an outer terminal; a cap assembly combined with the case and sealing the case, and combined with the outer terminal; and a tab. The tab includes a terminal element connected with the outer terminal; left and right connection elements extended from ends of the terminal element and disposed to correspond to each other in parallel; and left and right inward junction elements connected at respective sides of the left and right connection elements through respective bending areas to form gaps relative to a part of the respective left and right connection elements and electrically connected with the uncoated region of the electrode assembly through the gaps. The motor is electrically coupled to the outer terminal of the rechargeable battery.

One embodiment of a tab connects an uncoated region of an electrode assembly to an outer terminal in a rechargeable battery. The tab includes a terminal element adapted for connection to the outer terminal; left and right connection elements, each extending from an opposite end of the terminal element at a substantially identical angle relative to the terminal element; and left and right inward junction elements, each connected at a respective side of the left and right connection elements through bending areas, such that if the bending areas are bent, gaps are formed between respective parts of the left and right connection elements and the left and right inward junction elements. The gaps are adapted to receive the uncoated region of the electrode assembly. The bending areas may be bent such that the left and right connection elements are electrically connected to the uncoated region when it is received in the gaps. Further, the left and right connection elements may extend from the terminal element in parallel.

One embodiment of a method of manufacturing a rechargeable battery includes providing an electrode assembly having a positive electrode, a negative electrode, and a separator interposed therebetween, the electrode assembly having an uncoated region; housing the electrode assembly in a case; combining a cap assembly with the case and an outer terminal; providing a tab having a terminal element, left and right connection elements extending from opposite ends of the terminal element at substantially identical angles relative to the terminal element, and left and right inward junction elements connected at a respective side of the left and right connection elements through bending areas, the tab formed in one piece; bending the bending areas to form gaps between respective parts of the left and right connection elements and the left and right inward junction elements; bending the left and right connection elements to extend from the terminal element in parallel; disposing the uncoated region of the electrode assembly within the gaps; electrically connecting the left and right connection elements to the uncoated region; and electrically connecting the terminal element to the outer terminal.

DETAILED DESCRIPTION

Hereinafter, examples of embodiments of the present invention are described in detail with reference to the accompanied drawings. The embodiments described herein are merely examples, and the present invention can be variously embodied without being limited to those described herein.

Figure 1:
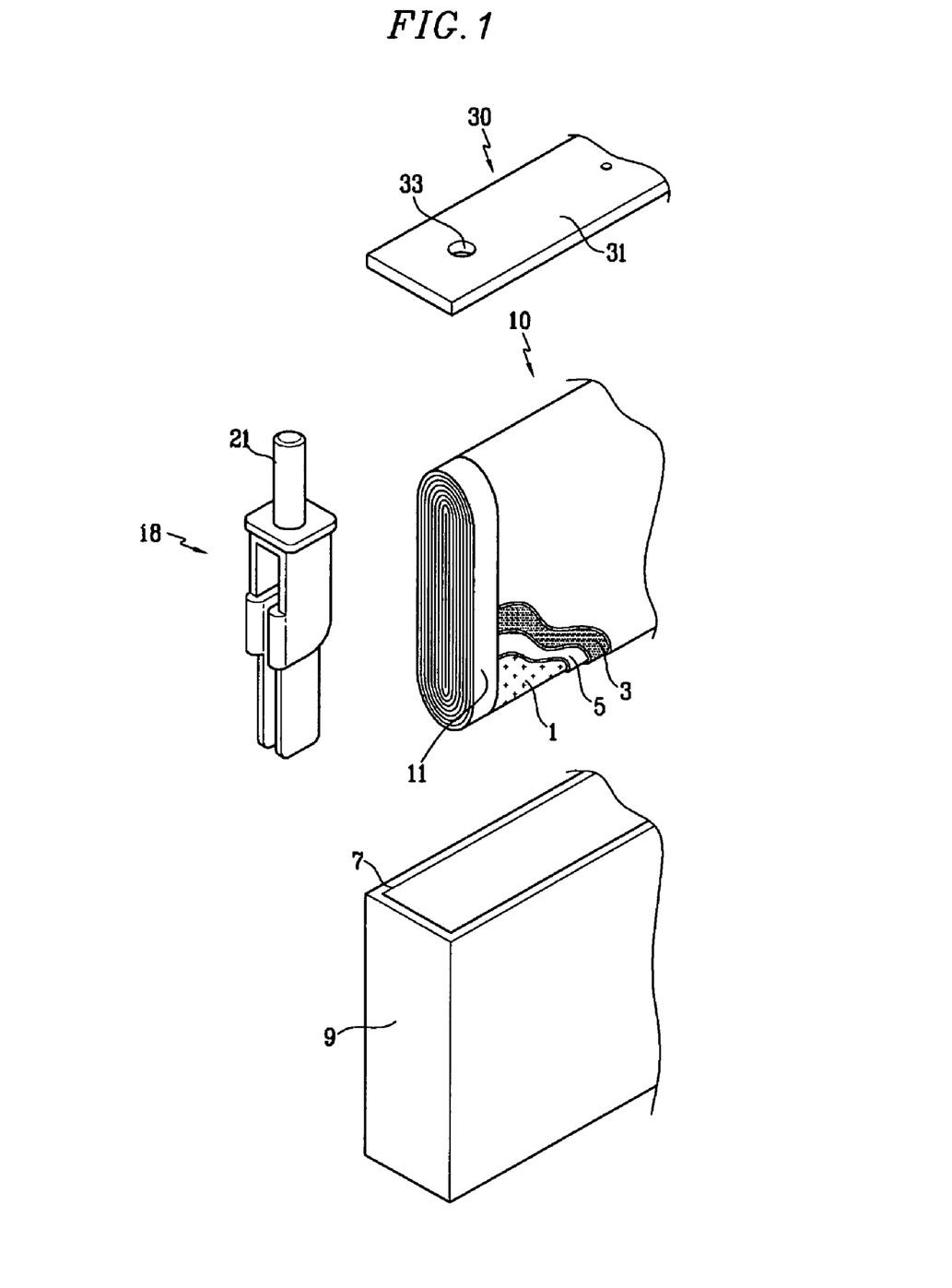
FIG. 1 is a partial exploded perspective view illustrating the structure of a rechargeable battery according to one embodiment of the present invention.

Referring to FIG. 1, only one end of an electrode assembly is illustrated, but the other end has the same structure. Therefore, only the positive electrode end of the electrode assembly is illustrated herein.

As shown in the drawing, a rechargeable battery of the present invention includes an electrode assembly 10, which is formed by stacking sheet-shaped positive and negative electrodes 1 and 3 and a separator 5 interposed therebetween and winding them in a jelly-roll shape, and a prismatic case 9 having an opening 7 at one end and a space for housing the electrode assembly 10.

In addition, the rechargeable battery includes a tab 20 that is welded to an outer terminal 21 at one end and welded to an uncoated region 11 of the electrode assembly 10, and a cap assembly 30 combined with the opening 7 of the case 9 and sealing the case 9 and having the outer terminal 21 that is attached to the tab 20 protruding therethrough.

Herein, when the tab 20 is welded to the outer terminal 21 they form a terminal assembly 18 that electrically connects the uncoated region 11 of the electrode assembly 10 with the outer terminal 21 of the terminal assembly.

The electrode assembly 10 is formed by stacking positive and negative electrodes 1 and 3, which are formed by coating current collectors with active materials, and a separator 5 interposed therebetween and by winding them in a jelly-roll shape.

According to this embodiment of the present invention, when the electrode assembly 10 is formed by stacking the positive and negative electrodes 1 and 3 and the separator 5 interposed therebetween and winding them in a jelly-roll shape, the uncoated region 11 of the positive electrode 1 and the uncoated region (not shown) of the negative electrode 3 may be disposed at respective ends of the electrode assembly 10.

In addition, the case 9 is formed of a conductive metal such as aluminum, an aluminum alloy, or nickel-plated steel, and is shaped as a quadrangular prism or another shape having a space for housing the electrode assembly 10.

The cap assembly 30 is formed as a cap plate 31 that can be air-tightly combined with the opening 7 of the case 9 to seal the case 9. The cap plate 31 has a terminal hole 33 through which the outer terminal 21 of the positive electrode 1 can protrude and a terminal hole (not shown) through which the outer terminal (not shown) of the negative electrode 3 can protrude.

According to this embodiment of the present invention, when the case 9 is vertically positioned with the cap assembly on top (hereinafter, the description is based on this orientation when particular directions are not described), the electrode assembly 10 is housed therein with the uncoated region 11 of the positive electrode 1 and the uncoated region (not shown) of the negative electrode 3 corresponding to respective sides of the case 9.

The uncoated regions of the electrode assembly 10 are respectively electrically connected to the outer terminals, that is, the positive and negative terminals, through the tabs. The outer terminals are partly protruded through the terminal holes of the cap assembly.

Hereinafter, the tab 20 of the positive electrode 1 according to this embodiment of the present invention is illustrated with reference to FIGS. 2 to 5.

Figure 2:
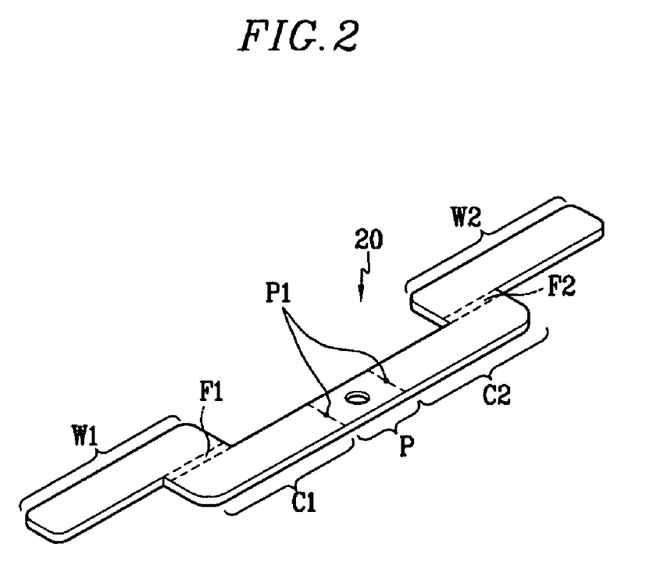
FIG. 2 is an exploded perspective view showing partial constituent elements of a terminal assembly of a rechargeable battery according to an embodiment of the present invention.

The tab 20 is formed by folding a thin plate, as shown in FIG. 2, with a unitary structure through plate-processing.

The tab 20 that is formed of the thin plate includes a terminal element P connected with the outer terminal 21 in the middle, two connection elements C1 and C2 extended from both sides of the terminal element P, and two inward junction elements W1 and W2 respectively disposed through each bending area F1 and F2 to be partly extended from the connection elements C1 and C2, thereby forming a symmetrical structure centering on the terminal element P.

Figure 3:
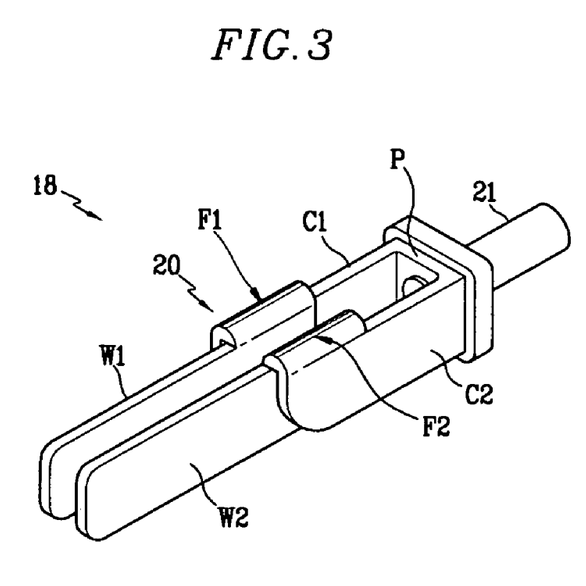
FIG. 3 is a front perspective view illustrating a terminal assembly of a rechargeable battery according to an embodiment of the present invention.
Figure 4:
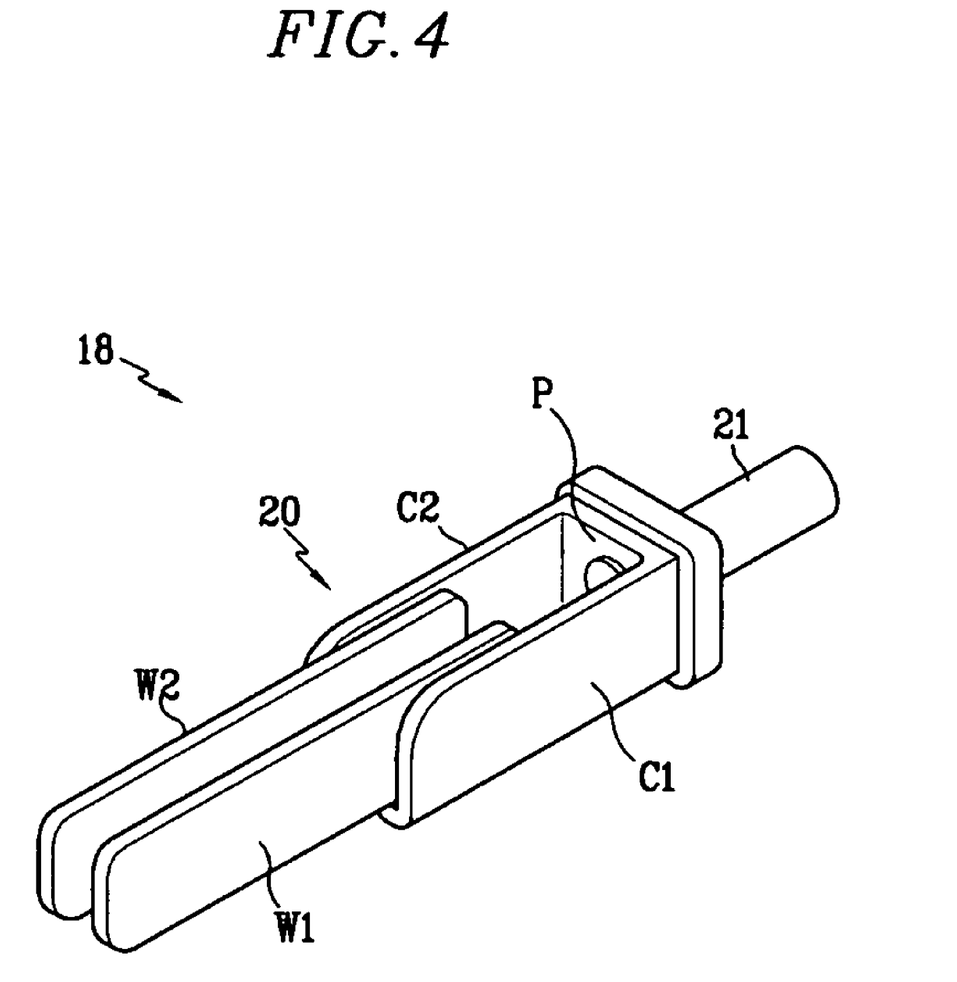
FIG. 4 is a rear perspective view illustrating a terminal assembly of a rechargeable battery according to the embodiment shown in FIG. 3.

The connection elements C1 and C2 of the tab 20 are perpendicularly bent at each connection part P1, so that the connection elements C1 and C2 can correspond to each other in parallel, and the inward junction elements W1 and W2 are bent at an angle of 180° through each bending area F1 and F2 extended from the connection elements C1 and C2 to face the connection elements C1 and C2.

In other words, the terminal element P forms a right angle with the right and left connection elements C1 and C2, and the inward junction elements W1 and W2 are bent at an angle of 180° through each bending area F1 and F2 to correspond to the connection elements C1 and C2 and are parallel with each other.

Respective gaps, which may be predetermined, are formed between the left and right connection elements C1 and C2 and the inward junction elements W1 and W2 facing the connection elements C1 and C2. The gaps correspond to each bending area F1 and F2, and can respectively hold the uncoated regions of the electrode assembly 10.

According to this embodiment of the present invention, each element of the tab 20, such as the terminal element P, the left and right connection elements C1 and C2, and the left and right inward junction elements W1 and W2 can be formed by processing a metal plate. The tab 20 is welded to the outer terminal 21 through the terminal element P to form a terminal assembly 18.

Each connection element C1 and C2 of the tab 20 has the same area from each end thereof to each connection part P1, where the connection elements C1 and C2 are connected with the terminal element P. They also form gaps, which may be predetermined, from the left and right inward junction elements W1 and W2 through both bending areas F1 and F2, so that the uncoated region 11 can be fitted therein.

Herein, the gaps may be formed to have the same thickness as that of the uncoated region 11.

Figure 5:
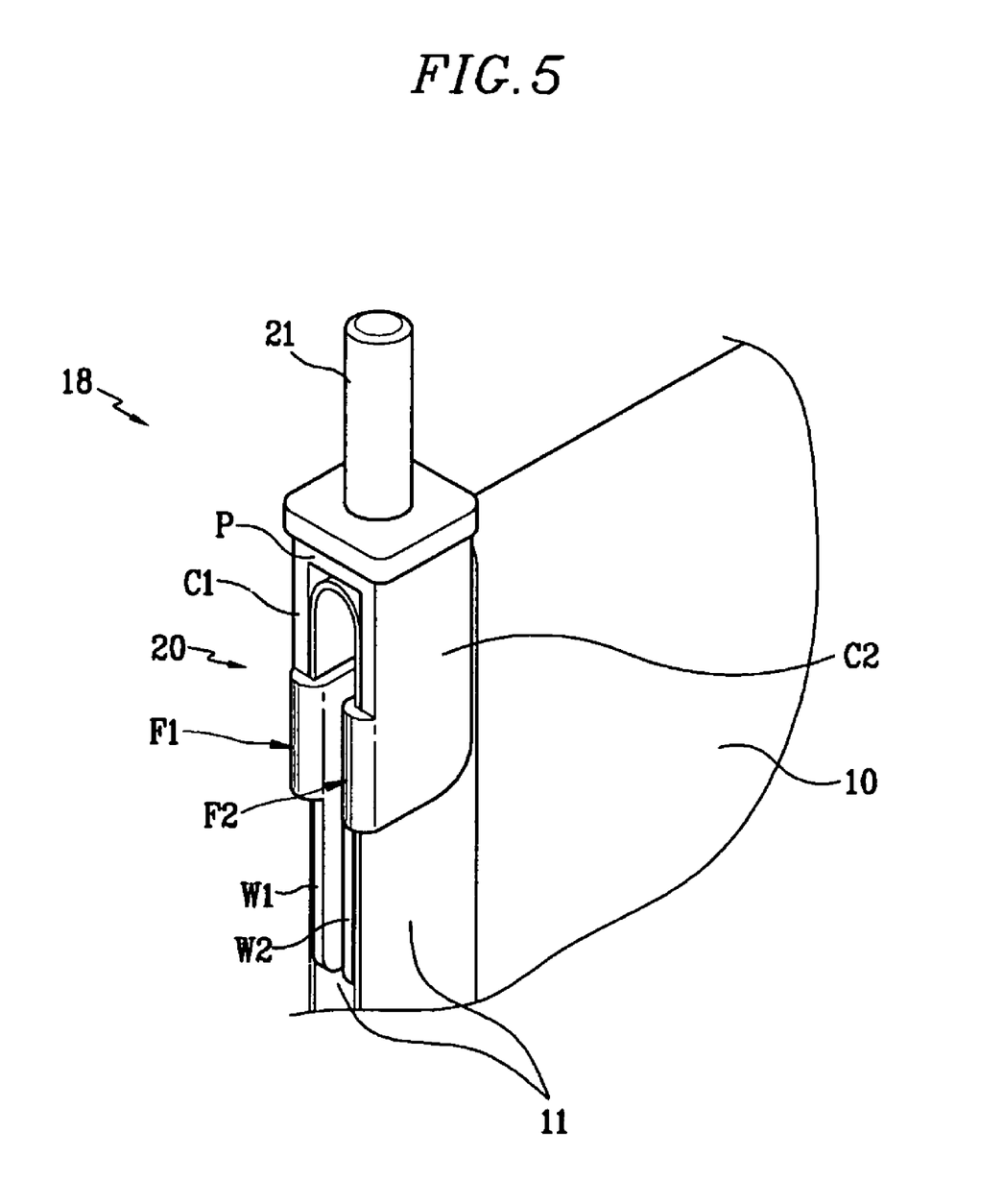
FIG. 5 illustrates the terminal assembly of FIGS. 3 and 4 coupled to an electrode assembly according to an embodiment of the present invention.

In addition, when the uncoated region 11 is fitted into the gap between the left and right connection elements C1 and C2 and the left and right inward junction elements W1 and W2, the left and right connection elements C1 and C2 are disposed outside of the uncoated region 11, and the left and right inward junction elements W1 and W2 are disposed inside of the uncoated region 11.

When the left and right inward junction elements W1 and W2 inwardly contact the uncoated region 11, they may be welded to the uncoated region 11 through ultrasonic welding to be fixed together.

According to this embodiment of the present invention, the tab 20 including a terminal assembly is formed of one plate, and thereby can be plate-processed into each element such as a terminal element P, right and left connection elements C1 and C2, and right and left inward junction elements W1 and W2. The plate-processing includes simply folding and pressing a metal plate. Herein, the right and left inward junction elements W1 and W2 are bent at an angle of 180° with the right and left connection elements C1 and C2, and the right and left connection elements C1 and C2 are also bent at right angles with the terminal element P at each connection part P1, so that they can correspond to each other in parallel.

This embodiment thus has an advantage of easy manufacturing of the tab 20, and thereby mass production thereof by using plate-processing is possible.

In addition, this embodiment has another advantage of doubling electro-conductivity, since a tab of the present invention is symmetrically formed to have two same inward junction elements W1 and W2 welded with uncoated regions 11 centering a terminal element P, which leads to improved welding and doubling of the current collecting areas. Increasing the current collecting areas also increases the electro-conductivity of the tab, which can secure required battery characteristics. Because this embodiment of the tab can be made thin, it can avoid poor welding to the uncoated region, and the need to increase welding power output, which can destroy the thin uncoated region.

The present invention also has an advantage of decreasing resistances, since the connection elements C1 and C2 are also formed to have the same cross-sectional areas from each end thereof to a connection part P1 at both sides of the terminal element P, which doubles the entire cross-sectional area.

FIGS. 6 to 9 illustrate a tab 20' according to another embodiment of the present invention. The tab 20' includes a terminal element P' connected with the outer terminal 21 at its middle, right and left connection elements C1' and C2' extended from both sides of the terminal element P', and left and right inward junction elements W1' and W2' extended from the bending areas F1' and F2' formed at each partial side of the connection elements C1' and C2'.

Figure 6:
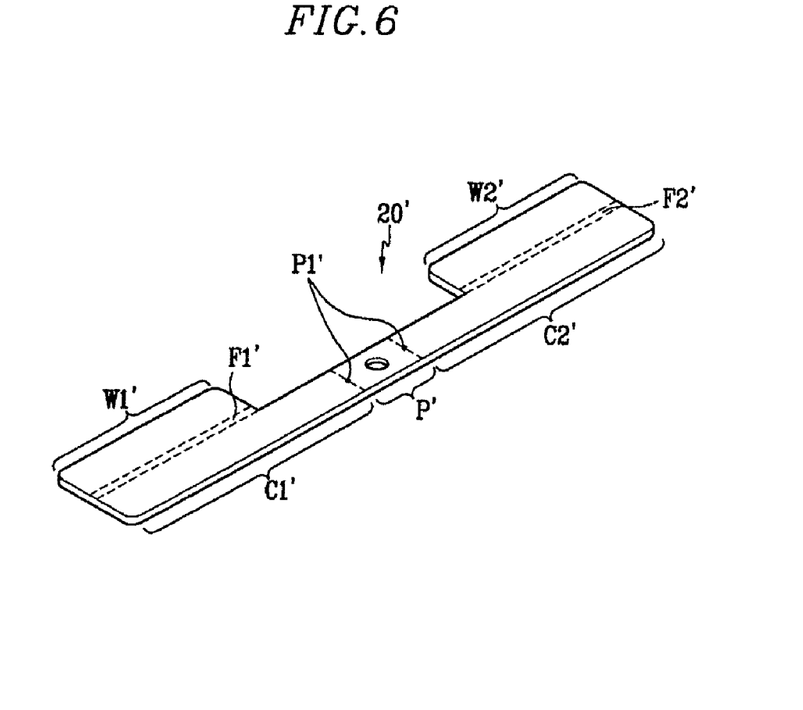
FIG. 6 is a perspective view illustrating partial constituent elements of a terminal assembly of a rechargeable battery according to another embodiment of the present invention.

The right and left connection elements C1' and C2' of the tab 20' are extended up to each end of the junction elements W1' and W2', forming a unitary structure therewith through the bending areas F1' and F2'.

Figure 7:
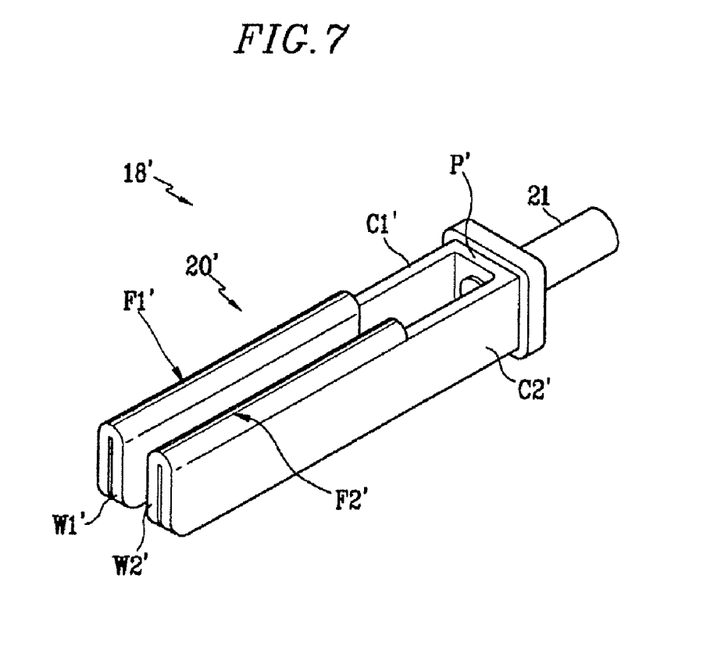
FIG. 7 is a front perspective view illustrating a terminal assembly of a rechargeable battery according to another embodiment of the present invention.
Figure 8:
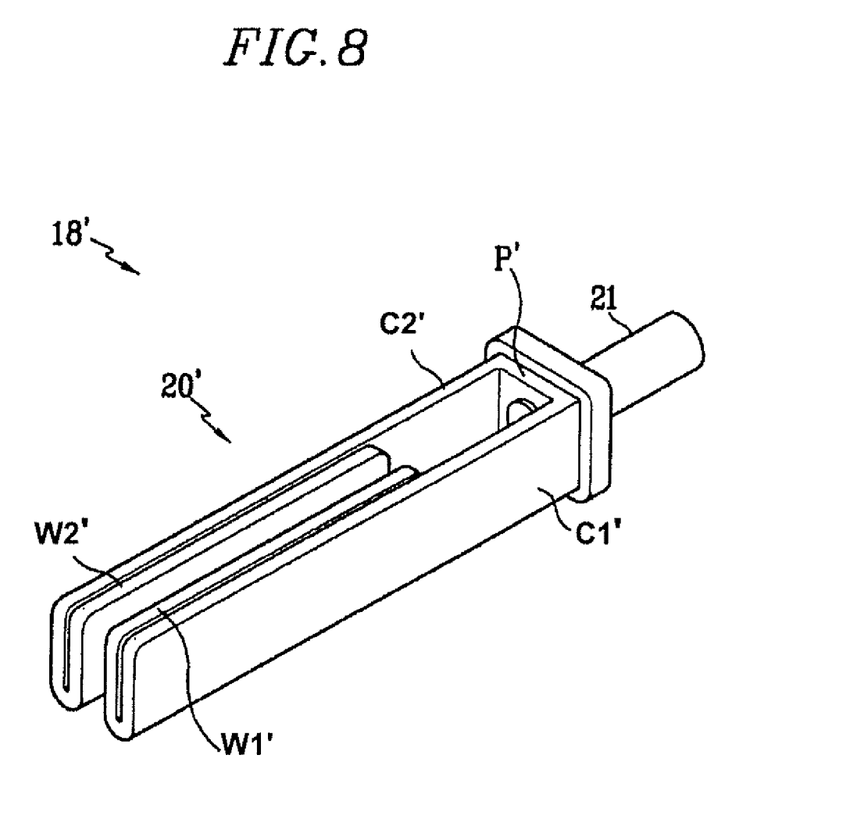
FIG. 8 is a rear perspective view illustrating a terminal assembly of a rechargeable battery according to the embodiment shown in FIG. 7.

Accordingly, the tab 20' is fabricated by bending the right and left connection elements C1' and C2' extended from both ends of the terminal element P' at right angles with the terminal element P', so that the connection elements C1' and C2' can correspond to each other in parallel, and also by bending the left and right inward junction elements W1' and W2' at an angle of 180° with the connection elements C1' and C2' through the bending areas F1' and F2' extended from the connection elements C1' and C2'.

In other words, the terminal element P' of the tab 20' is at a right angle at a connection part P1' to the connection elements C1' and C2', and the left and right inward junction elements W1' and W2' are bent at an angle of 180° with the connection elements C1' and C2' through each bending area F1' and F2' to correspond to each other in parallel.

Herein, the left and right inward junction elements W1' and W2' are connected with the connection elements C1' and C2' through the bending areas F1' and F2' over the entire length thereof. Gaps, which may be predetermined, are respectively formed between the connection elements C1' and C2' and inward junction elements W1' and W2', so that they can hold an uncoated region 11 of the electrode assembly 10.

The tab 20' can be formed by plate-processing one metal plate with a unitary structure, and thereby it can include the terminal element P', the left and right connection elements C1' and C2', and the left and right inward junction elements W1' and W2' in the one plate. Then, it can be welded to an outer terminal 21 mounted through the terminal element P, forming a terminal assembly 18'.

Each left and right connection element C1' and C2' of the tab 20' has the same cross-sectional area from each end thereof to each connection part P1'. The bending areas F1' and F2' are respectively formed corresponding to gaps, which may be predetermined, between the left and right connection elements C1' and C2' and the left and right inward junction elements W1' and W2' over the whole length of the junction elements W1' and W2', so that they can hold the uncoated regions 11.

The gaps may be formed to have the same thickness as that of the uncoated regions 11.

Figure 9:
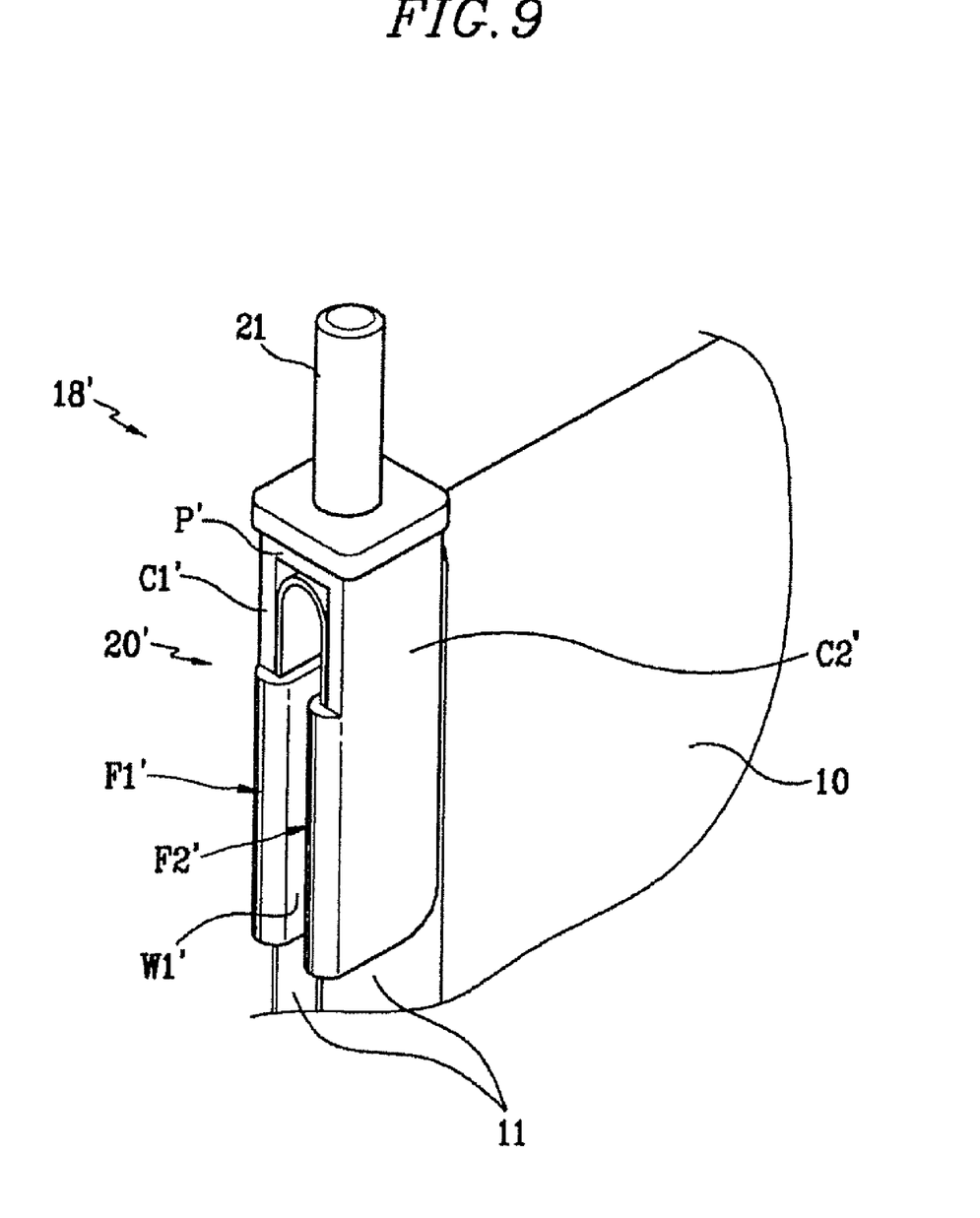
FIG. 9 illustrates the terminal assembly of FIGS. 7 and 8 coupled to an electrode assembly according to an embodiment of the present invention.

In addition, when the tab 20', as illustrated in FIG. 9, is fitted with the uncoated regions 11 through the gaps between the connection elements C1' and C2' and the inward junction elements W1' and W2', the left and right connection elements C1' and C2' are disposed outside of the uncoated regions 11, and the junction elements W1' and W2' are disposed inside thereof.

Herein, the inward junction elements W1' and W2' may be welded to the uncoated regions 11 along with the connection elements C1' and C2' extended therefrom through ultrasonic welding.

According to this embodiment of the present invention, since the tab 20' of the terminal assembly 18' includes connection elements C1' and C2' extended to correspond to the entire length of the inward junction elements W1' and W2', it can have an effect of enlarging the current collecting area to thereby double the electroconductivity. In addition, since the connection elements C1' and C2' can support the uncoated regions 11 of the electrode assembly 10 along with the inward junction elements W1' and W2' during the welding, they can prevent deformation of the uncoated regions 11.

Figure 10:
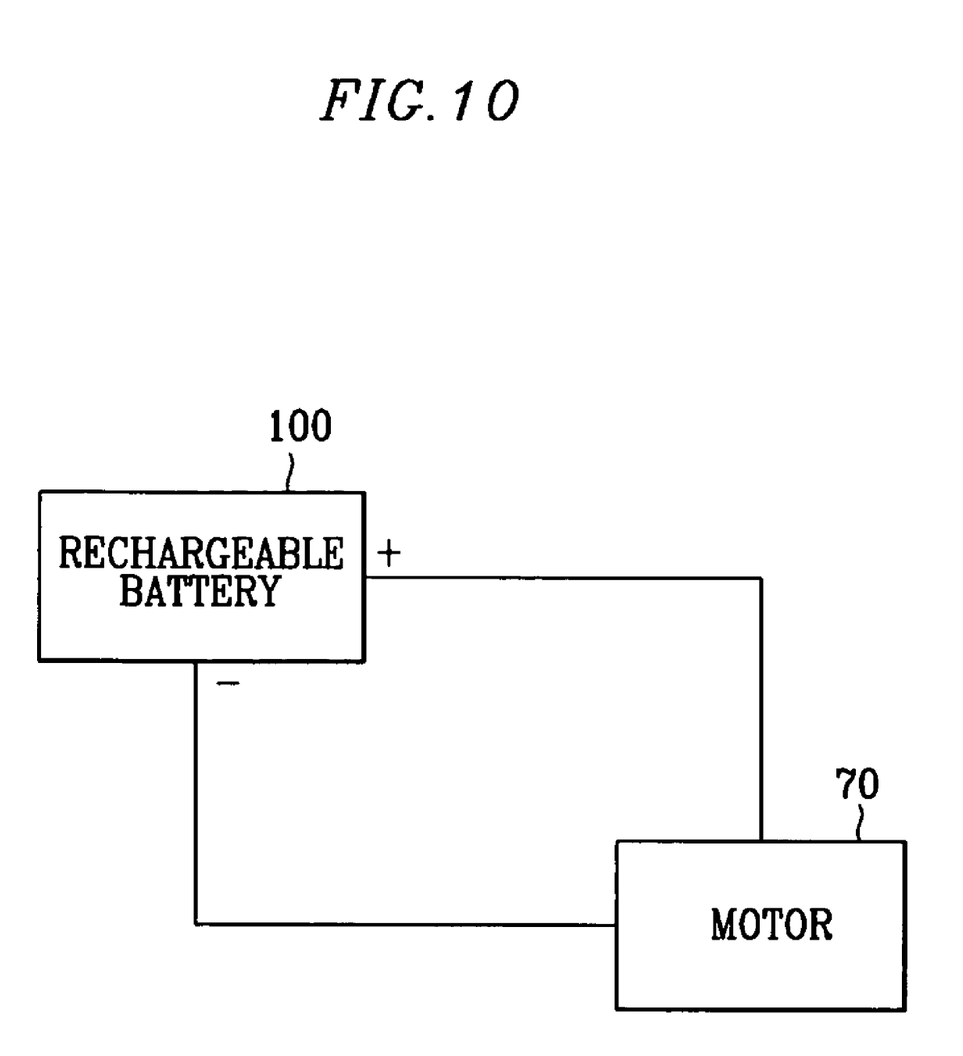
FIG. 10 is a schematic block diagram showing one embodiment of a motor system according to the present invention.

As shown in FIG. 10, a rechargeable battery 100 as described above can be useful for a machine driven by a motor 70 requiring high power such as a hybrid automobile (HEV), an electric vehicle (EV), a cordless cleaner, a motorbike, or an electric scooter.

In addition, since a rechargeable battery according to these embodiments of the present invention has an enlarged area between an uncoated region and an outer terminal, it can have decreased resistance.

Furthermore, since these embodiments of a tab can be easily fabricated, these embodiments have an advantage of easy mass production of a tab, thereby lowering the manufacturing cost thereof.

Various embodiments of the present invention can also maximize a contact area between the tab and the uncoated region, and thereby prevent deformation of an uncoated region during the welding and improve current collecting efficiency, resulting in improved power output performance of a rechargeable battery.

Moreover, these embodiments can uniformly lead a current generated from each part of an electrode assembly and can thereby satisfy battery characteristics for driving a motor requiring high power and large capacity.

While this invention has been described in connection with what are presently considered to be practical exemplary embodiments, it is to be understood that the invention is not limited to the disclosed embodiments, but, on the contrary, is intended to cover various modifications and equivalent arrangements included within the spirit and scope of the appended claims and their equivalents.

What is claimed is:

1. A rechargeable battery comprising:
    an electrode assembly comprising a sheet-shaped positive electrode and a sheet-shaped negative electrode wound together, and a separator interposed therebetween, at least one of the positive electrode or the negative electrode having an uncoated region at an end thereof;
    a case for housing the electrode assembly;
    an outer terminal;
    a cap assembly combined with the case and sealing the case, and combined with the outer terminal; and
    a tab, wherein the tab comprises:
        a terminal element connected with the outer terminal;
        left and right connection elements extended from ends of the terminal element and disposed to correspond to each other in parallel; and
        left and right inward junction elements connected at respective sides of the left and right connection elements through respective bending areas to form gaps relative to a part of the respective left and right connection elements and electrically connected with the uncoated region, each of the gaps receiving a portion of the uncoated region therein,
    wherein the bending areas are bent toward each other from the respective sides of the left and right connection elements, and the left and right inward junction elements are between the left and right connection elements.

2. The rechargeable battery of claim 1, wherein the gaps are predetermined.

3. The rechargeable battery of claim 1, wherein the terminal element, the left and right connection elements, and the left and right inward junction elements are formed of an integrally combined plate.

4. The rechargeable battery of claim 1, wherein the terminal element, the left and right connection elements, and the left and right inward junction elements are integrally combined by plate-processing a metal plate.

5. A rechargeable battery comprising:
    an electrode assembly comprising a positive electrode, a negative electrode, and a separator interposed therebetween, the electrode assembly having an uncoated region;
    a case for housing the electrode assembly;
    an outer terminal;
    a cap assembly combined with the case and sealing the case, and combined with the outer terminal; and
    a tab, wherein the tab comprises:
        a terminal element connected with the outer terminal;
        left and right connection elements extended from ends of the terminal element and disposed to correspond to each other in parallel; and
        left and right inward junction elements connected at respective sides of the left and right connection elements through respective bending areas to form gaps relative to a part of the respective left and right connection elements and electrically connected with the uncoated region of the electrode assembly through the gaps,
    wherein the terminal element of the tab is bent at right angles relative to each of the left and right connection elements, and the left and right connection elements are bent at an angle of 180° relative to the left and right inward junction elements through the respective bending areas.

6. The rechargeable battery of claim 1, wherein the left and right connection elements of the tab have respective ends, and an area from each of the respective ends to a connection part of the terminal element is substantially the same.

7. The rechargeable battery of claim 1, wherein the uncoated region of the electrode assembly is held in the gaps.

8. The rechargeable battery of claim 7, wherein the gaps each have a width substantially the same as a thickness of the uncoated region.

9. The rechargeable battery of claim 1, wherein the terminal element is welded to the outer terminal.

10. The rechargeable battery of claim 1, wherein the left and right connection elements of the tab are disposed on a first side of the uncoated region, and the left and right inward junction elements are disposed on a second side of the uncoated region.

11. The rechargeable battery of claim 10, wherein the electrode assembly has an inside and an outside, and wherein the first side of the uncoated region faces the outside and the second side of the uncoated region faces the inside.

12. The rechargeable battery of claim 1, wherein the left and right inward junction elements are connected with the uncoated region through ultrasonic welding.

13. The rechargeable battery of claim 1, wherein the left and right connection elements of the tab extend to ends of the respective left and right inward junction elements and are connected with the respective left and right inward junction elements through the respective bending areas.

14. The rechargeable battery of claim 13, wherein the gaps are formed over entire lengths of the left and right inward junction elements and the left and right connection elements respectively corresponding thereto.

15. The rechargeable battery of claim 14, wherein the gaps each have a width substantially the same as a thickness of the uncoated region.

16. A motor system comprising:
    a rechargeable battery, wherein the rechargeable battery comprises:

an electrode assembly comprising a sheet-shaped positive electrode and a sheet-shaped negative electrode wound together, and a separator interposed therebetween, at least one of the positive electrode or the negative electrode having an uncoated region at an end thereof;

a case for housing the electrode assembly;

an outer terminal;

a cap assembly combined with the case and sealing the case, and combined with the outer terminal; and a tab, wherein the tab comprises:
- a terminal element connected with the outer terminal;
- left and right connection elements extended from ends of the terminal element and disposed to correspond to each other in parallel; and
- left and right inward junction elements connected at respective sides of the left and right connection elements through respective bending areas to form gaps relative to a part of the respective left and right connection elements and electrically connected with the uncoated region, each of the gaps receiving a portion of the uncoated region therein, wherein the bending areas are bent toward each other from the respective sides of the left and right connection elements, and the left and right inward junction elements are between the left and right connection elements; and a motor electrically coupled to the outer terminal of the rechargeable battery.

* * * * *